March 31, 1959

E. ELLERMAN 2,879,852

COMBINATION PUSH RAKE AND LEVELER

Filed Nov. 14, 1957

INVENTOR
Edward Ellerman

BY Robert C. Sullivan

ATTORNEY

United States Patent Office 2,879,852
Patented Mar. 31, 1959

2,879,852

COMBINATION PUSH RAKE AND LEVELER

Edward Ellerman, Littleton, Colo.

Application November 14, 1957, Serial No. 696,517

2 Claims. (Cl. 172—136)

This invention relates to garden tools and the like, and more particularly to a combination rake and leveling device, particularly useful in preparing seed beds for new lawns and gardens.

It is an object of this invention to provide a combination push rake and leveler which is useful in the preparation of seed beds for new lawns and gardens as well as for other gardening purposes.

It is another object of this invention to provide a combination tool for use in gardening which includes both a soil leveling means and a soil raking means which can be selectively moved into operative position.

It is still another object of this invention to provide a combination garden tool including both a leveling and a raking device which can be made and sold at an economical price.

It is a further object of this invention to provide a combination garden rake and soil leveler which is mounted on wheels and which can perform the raking and leveling operations in a speedy and efficient manner.

In achievement of these objectives, there is provided in accordance with an embodiment of this invention, a combination push rake and leveling device particularly useful in preparing seed beds for new lawns and gardens and including a framework having a pair of oppositely disposed bracket members mounted on opposite legs of a pivotally movable handle for pivotal movement about the axis of a pair of supporting wheels. Each of the bracket members includes four frame elements defining a diamond-shaped bracket assembly. A rake member is supported on one side of the pivotal axis of the handle by one pair of corresponding ends of the respective oppositely disposed brackets, while a leveler blade is supported on the opposite side of the pivotal axis of the handle by the opposite ends of the respective bracket members. The handle member and the support framework carried thereby may be swung about the axis of the wheels in such manner as to lower either the push rake or the leveler into engagement with the soil and to simultaneously raise the other implement out of engagement with the soil. A further feature of the construction is the mounting arrangement which permits independent angular adjustment of both the push rake and leveler about their respective supports.

Further objects and advantages of the invention will become apparent from the following description taken in conjunction with the accompanying drawing in which.

Figure 1:
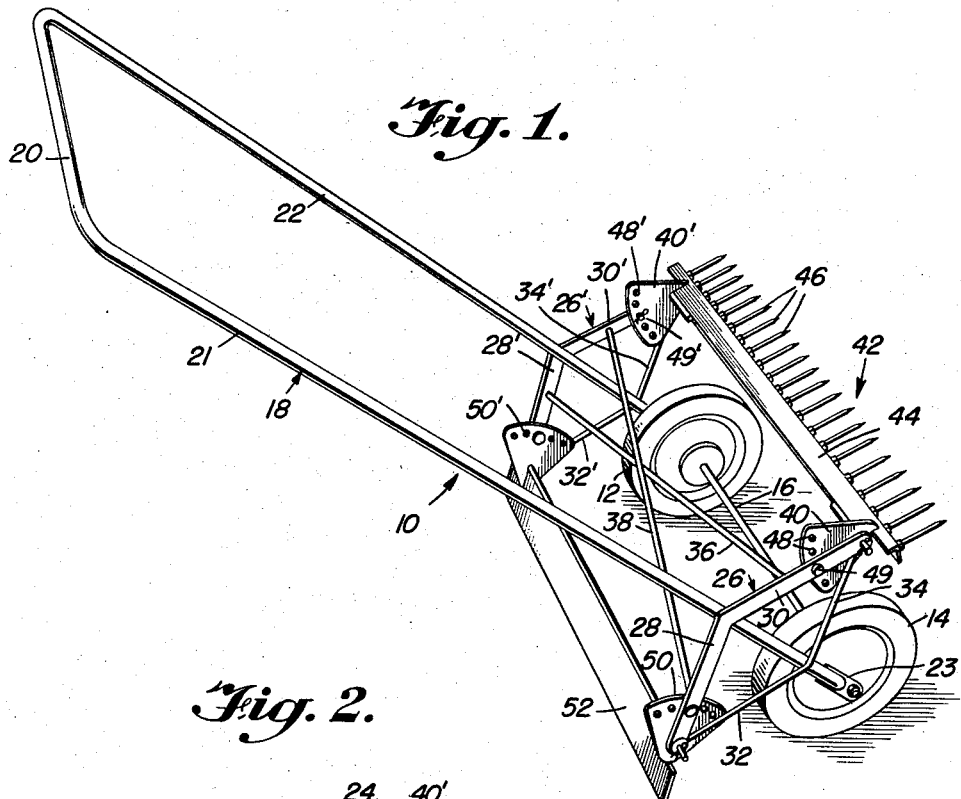
Fig. 1 is a perspective view of the combination push rake and leveler of the invention.
Figure 2:
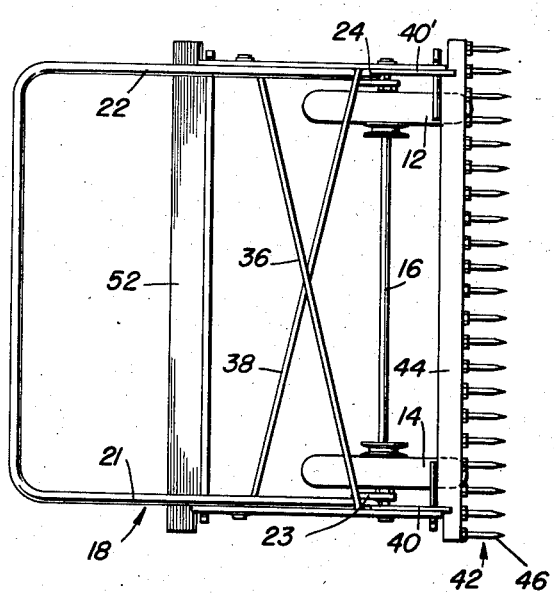
Fig. 2 is a top plan view of the combination push rake and leveler.
Figure 3:
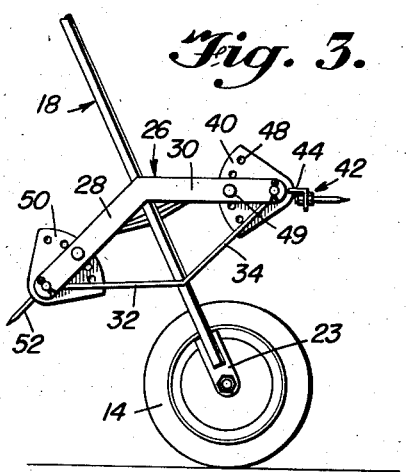
Fig. 3 is a side elevation view, partially broken away, of the push rake and leveler.

Referring now to the drawing, the combination push rake and leveler of the invention is generally indicated at 10 and includes a pair of oppositely disposed wheel members 12 and 14 mounted upon an axle 16. A U-shaped handle member generally indicated at 18 having a hand grip portion 20 and a pair of side portions or legs 21 and 22 is welded or otherwise rigidly attached to a pair of oppositely disposed short arms or crank members 23 and 24 which are secured against movement on the opposite ends of axle 16. Thus, handle 18 and axle 16 turn together as a unit about the axis of the wheel bearings when handle 18 is swung about the axis of the wheels. Obviously, the handle could also pivot directly on axle 16, with the axle remaining stationary.

Rigidly secured to the lower end of each of the handle legs 21 and 22 are a pair of similar support bracket assemblies generally indicated at 26 and 26', respectively. Support bracket assembly 26 will be described as typical of both brackets 26 and 26'. Support bracket 26 includes a pair of arms 28 and 30 which may be made of flat bar metal and which are inclined downwardly in forward and rearward directions from the handle leg 21 in such manner that the arms 28 and 30 subtend an angle of approximately 120 degrees. Bracket assembly 26 also includes a pair of rod-like members 32 and 34 which incline upwardly in opposite directions from the lower portion of handle leg 21 and are rigidly joined, as by welding, to the outer ends of the upper arms 28 and 30. The arms 28, 30 and rods 32, 34 together define a bracket structure in the form of a substantially diamond-shaped parallelogram. Bracket assembly 26 is rigidly secured to the lower portion of handle leg 21, preferably by welds at the junction of upper arms 28 and 30 and at the junction of lower rods 32 and 34.

Support bracket 26' on the opposite side of the combination push rake and leveler is substantially identical to bracket 26 just described and will not be described in detail except to point out that bracket 26' includes two downwardly inclined arms 28' and 30' and two upwardly inclined rods 32' and 34' which together form a diamond-shaped parallelogram which is rigidly connected as by welding to the lower end of handle leg 22.

In order to reinforce the structure of the combination push rake and lever, a brace rod 36 extends diagonally across the framework from an intermediate point of arm 30 on one side of the device to an intermediate point of arm 28' on the opposite side of the device and a second brace rod 38 extends between an intermediate point of arm 28 on one side to an intermediate point on arm 30' on the opposite side of the push rake and leveler.

A sector plate 40 is pivotally secured to the forward end of bracket structure 26 at the junction between arm 30 and rod 34, and a similar sector plate 40' is pivotally secured to the forward end of bracket structure 26' at the junction of arm 30' and rod 34'. Rigidly secured to and extending between the oppositely disposed sector plates 40 and 40' is a rake member generally indicated at 42 including an angle member 44 having one edge rigidly secured to the oppositely disposed sector plates 40 and 40' and another edge which supports a plurality of rake teeth 46. Sector plates 40 and 40' are provided with apertures 48 and 48' which may be aligned with a suitable detent pin or other suitable detent means 49 or 49' to hold the respective sector plates 40 and 40' and thus the rake member 42 which they support in a predetermined angular position with respect to the supporting framework.

At the rear end of the combination push rake and leveler, with respect to the views shown in the drawings, a pair of sector plates 50 and 50' are pivotally supported by the brackets 26 and 26' in a manner similar to that previously described for the sector plates 40 and 40'. Rigidly connected to and extending between sector plates 50 and 50' is a flat leveler blade 52 whose angle may be adjusted by pivotally moving the sector plates 50 and 50' about their respective pivotal connections to brackets 26 and 26' and passing a detent pin or the like through apertures of the sector plates 50 and 50' and the arms 28 and 28' in a manner similar to that described in connection with the sector plates 40 and 40'.

In using the combination push rake and leveler hereinbefore described, either the rake 42 or the leveler blade 52 may be selectively used by swinging the handle 18 about the axis of the wheels into a position in which either one of the implements is in engagement with the soil while the other implement is elevated above the soil. Thus, for example, as shown in Fig. 1, the leveler 52 is engaged with the soil while the rake 42 is disposed in an elevated position. By swinging handle 18 in a clockwise direction with respect to the view shown in Fig. 1, rake 42 is moved downwardly into engagement with the soil and leveler blade 52 is simultaneously raised to an elevated position.

In using the combination device for leveling, leveling blade 52 is engaged with the soil as shown in Fig. 1 and is adjusted to the desired angle by adjusting the sector blades 50 and 50' as previously explained. The combination push rake leveler is then pushed forwardly and the leveling blade 52 will remove or drag off the soil from the high places of the seed bed and dump the soil into the lower places, thus making a smooth surface for the seed bed. After the seed bed has been leveled, it is then ready for raking and by pivotally swinging handle 18 about the axis of the wheels rake member 42 may be engaged with the soil. The combination push rake and leveler may be then pushed and pulled backwardly and forwardly as when using a hand garden rake, to rake the soil as required. Furthermore, the angle of the rake with respect to the ground can be adjusted by adjusting the sector plates 40 and 40' which support rake 42.

It can be seen from the foregoing that there is provided in accordance with this invention a garden tool which has great utility and which is particularly useful for preparing seed beds for new lawns and gardens. The combination push rake and leveler includes in a single wheeled structure a device for leveling the seed bed and also a device for raking the seed bed and mounts these two devices on a supporting framework carried by the wheels in such manner that either the leveling device or the raking device may be selectively used as desired. Furthermore, both the rake and leveler may be angularly adjusted to cause the respective implements to engage the soil at the optimum angle. The combination push rake and leveler is very speedy and efficient in operation and can perform the leveling and raking operation much faster than can be done with tools of the prior art.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. A combination rake and soil leveling device comprising a framework including a pair of oppositely disposed laterally spaced bracket members and brace means rigidly interconnecting said bracket members and maintaining said bracket members uniformly laterally spaced throughout their length, a pair of laterally spaced wheel members supporting said framework for movement along the ground and respectively positioned on a common axis adjacent the respective bracket members, said bracket members being mounted for pivotal movement about the axis of said wheel members, an elongated rake member mounted between and supported by said pair of laterally spaced bracket members on one side of said axis, an elongated soil leveling member mounted between and supported by said pair of laterally spaced bracket members on an opposite side of said axis, said rake member and said soil leveling member each extending for substantially the entire lateral distance between the oppositely disposed bracket members, and a handle member rigidly connected to said framework and effective to pivotally move said framework about its pivotal axis to selectively engage either said rake member or said leveling member with the ground.

2. A combination rake and soil leveling device comprising a generally U-shaped handle member including a pair of laterally spaced handle portions, said handle portions being connected together at their upper end, a separate bracket member rigidly attached to each of said handle portions adjacent the lower end of the respective handle portion and in laterally spaced relation to the bracket member attached to the other handle portion, brace means rigidly interconnecting the respective bracket members and maintaining said bracket members uniformly laterally spaced apart from each other throughout their length, a pair of laterally spaced wheel members lying on a common axis and respectively positioned adjacent the respective bracket members to support said bracket members for movement along the ground, an elongated rake member mounted between and supported by the laterally spaced bracket members on one side of said axis, and an elongated soil leveling member mounted between and supported by the laterally spaced bracket members on an opposite side of said axis, said rake member and said soil leveling member each extending for substantially the entire lateral distance between the oppositely disposed bracket members, said handle portions being mounted for pivotal movement about said axis to selectively engage either said rake member or said leveling member with the ground.

References Cited in the file of this patent

UNITED STATES PATENTS

| | | |
|---|---|---|
| 625,386 | Durnell | May 23, 1899 |
| 712,907 | Clark | Nov. 4, 1902 |
| 764,051 | Hanger | July 5, 1904 |